United States Patent

Kondo et al.

[11] Patent Number: 5,666,164
[45] Date of Patent: *Sep. 9, 1997

[54] IMAGE SIGNAL CONVERTING APPARATUS

[75] Inventors: Tetsujiro Kondo; Masashi Uchida; Kunio Kawaguchi, all of Kanagawa, Japan

[73] Assignee: Sony Corporation, Tokyo, Japan

[*] Notice: The term of this patent shall not extend beyond the expiration date of Pat. No. 5,469,216.

[21] Appl. No.: 284,560

[22] PCT Filed: Dec. 9, 1993

[86] PCT No.: PCT/JP93/01786

§ 371 Date: Oct. 24, 1994

§ 102(e) Date: Oct. 24, 1994

[87] PCT Pub. No.: WO94/14278

PCT Pub. Date: Jun. 23, 1994

[30] Foreign Application Priority Data

| Dec. 10, 1992 | [JP] | Japan | 4-330592 |
| Jun. 14, 1993 | [JP] | Japan | 5-167518 |
| Jun. 18, 1993 | [JP] | Japan | 5-172617 |

[51] Int. Cl.$^6$ ............ H04N 7/01; H04N 11/20
[52] U.S. Cl. ............ 348/441; 348/458; 348/421; 348/399
[58] Field of Search ............ 348/441, 445, 348/448, 458, 459, 394, 411, 412, 415, 421, 399; H04N 7/01, 11/20

[56] References Cited

U.S. PATENT DOCUMENTS

| 4,831,442 | 5/1989 | Gillies | 358/140 |
| 5,347,599 | 9/1994 | Yamashita et al. | 348/448 |
| 5,469,216 | 11/1995 | Takahashi et al. | 348/399 |
| 5,495,297 | 2/1996 | Fujimori et al. | 348/590 |

FOREIGN PATENT DOCUMENTS

| 0293189 | 11/1988 | European Pat. Off. . | |
| 0571180 | 11/1993 | European Pat. Off. . | |
| 2-122781 | 5/1990 | Japan | H04N 7/01 |
| 2-166889 | 6/1990 | Japan | H04N 7/01 |
| 2-276388 | 11/1990 | Japan | H04N 7/01 |
| 9217983 | 10/1992 | WIPO . | |

Primary Examiner—Michael H. Lee
Attorney, Agent, or Firm—Jay H. Maioli

[57] ABSTRACT

An input digital image signal (SD signal) is converted into a high resolution digital video signal (HD signal). A considered pixel is categorized as a class corresponding to a one-dimensional, two-dimensional, or three-dimensional level distribution of a plurality of reference pixels of the SD signal. A predicted value of the considered pixel is generated by linear combination of values of a plurality of pixels of the SD signal adjacent to the considered pixel of the HD signal and predicted coefficients that have been learnt. In the learning process, predicted coefficients are determined by linear combination of the values of pixels of the SD signal and the predicted coefficients so that the sum of squares of the predicted value and the true value is minimized. Instead of the predicted coefficients, representative values may be determined for each class. In this case, the representative values are used as predicted values corresponding to the class of the input SD signal. Examples of the representative values are a base value of a block and a value normalized by dynamic range DR.

11 Claims, 10 Drawing Sheets

| CONSIDERED HD PIXEL | SD PIXEL | | | | | | | | |
|---|---|---|---|---|---|---|---|---|---|
| | x 1 | x 2 | x 3 | x 4 | x 5 | x 6 | x 7 | x 8 | x 9 |
| A | a | b | c | d | e | f | g | h | i |
| B | a | d | c | b | i | h | g | f | e |
| C | a | h | g | f | e | d | c | b | i |
| D | a | f | g | h | i | b | c | d | e |

(n-1)   n   (n+1)

MODE 1

(n-1)   n   (n+1)

MODE 2

(n−1)　　　n　　　(n+1)

MODE 3

(n−1)　　　n　　　(n+1)

MODE 4

IMAGE SIGNAL CONVERTING APPARATUS

BACKGROUND OF THE INVENTION

1. Field of the Invention

The present invention relates to an image signal converting apparatus suitable for so-called up-conversion where an image signal with a standard resolution is converted into an image signal with a high resolution.

2. Description of the Prior Art

For example, in the case of TV signals, in addition to standard resolution (or standard definition SD) TV signals, high definition (or high definition HD) TV signals have been experimentally used for broadcasting. Further TV receivers that can receive HD signals have been practically used. In other words, the HD TV system is likely going to coexist with the SD TV system.

When the SD TV system and the HD TV system coexist, a signal converting apparatus for allowing an HD TV monitor to reproduce SD TV video signals will be required. Although various standards for the SD signals and the HD signals have been proposed, now assume an NTSC system for SD signals (number of scanning lines=525, number of fields=60, aspect ratio=4:3) and an HDTV system for HD signals (number of scanning lines=1125, number of fields=60, aspect ratio=16:9). The resolution of the HD signals is four times higher than the resolution of the SD signals. Thus, the converting apparatus should perform an up-converting process that increases the number of pixels of the input SD signal by four times so as to obtain the resolution of an HD signal.

Conventionally, the signal converting apparatus uses interpolating filters. FIG. 1 shows a block diagram of a conventional signal up-converting apparatus. An SD signal is supplied from an input terminal 1. The SD signal is sent to a horizontal interpolating filter 2 that doubles the number of pixels of the SD signal in the horizontal direction. The output of the horizontal interpolating filter 2 is sent to a vertical interpolating filter 3 that doubles the number of pixels of the output signal of the horizontal interpolating filter 2 in the vertical direction. The output of the vertical interpolating filter 3 is an HD signal. The HD signal is sent to an output terminal 4. In the conventional signal converting apparatus, the image is up-converted with such filters. For example, 0 data is inserted into an interpolating point so that the sampling frequency of the SD signal accords with the sampling frequency of the HD signal. An interpolated value corresponding to the interpolating point is formed by each filter.

FIG. 2 shows a construction of each of the interpolating filters. An SD signal is supplied to an input terminal 5. The SD signal is sent to multipliers that multiply the SD signal by filter coefficients $\alpha_n, \alpha_{n-1}, \ldots \alpha_0$. Each of outputs of the multipliers is sent to a register with a unit delay amount T. The output of each of the multipliers and the output of each of the registers T are added. An interpolated output is sent to an output terminal 6. In the horizontal interpolating filter 2, the unit delay amount T accords with a sample period. In the vertical interpolating filter 3, the unit delay amount T accords with a line period.

In the conventional image signal converting apparatus, since the SD signal is up-converted into the HD signal with the filters, the output HD signal is generated by processing the input SD signal. Thus, the resolution of the output HD signal is not higher than the resolution of the input SD signal.

An object of the present invention is to provide an image signal converting apparatus that can compensate the resolution of the output signal.

Another object of the present invention is to provide an image signal converting apparatus that categorizes the input signal as classes corresponding to local features of the input image signal so as to improve conversion accuracy.

SUMMARY OF THE INVENTION

A first aspect of the present invention is a signal converting apparatus for converting a first digital image signal into a second digital image signal having higher resolution than the first digital image signal, comprising a class categorizing means for categorizing a considered pixel of the second digital image signal as a class corresponding to a pattern of level distribution of a plurality of reference pixels of the first digital image signal, the reference pixels of the first digital image signal being disposed spatially and/or chronologically adjacent to the considered pixel, a memory means for storing predicted coefficients for each class and for outputting the predicted coefficients corresponding to class information received from the class categorizing means, and a predicted value generating means for calculating linear combination of the values of the pixels of the first digital image signal spatially and/or chronologically adjacent to the considered pixel so as to generate a predicted value of the considered pixel. The predicted coefficients are pre-learnt and predetermined.

A second aspect of the present invention is the signal converting apparatus of first aspect further comprising a learning device, comprising a means for forming the first digital image signal with the second digital image signal, a class categorizing means for categorizing a considered pixel of the second digital image signal as a class corresponding to a pattern of level distribution of a plurality of reference pixels of the first digital image signal, the reference pixels of the first digital image signal being disposed spatially and/or chronologically adjacent to the considered pixel, and a means for determining predicted coefficients for each class so that the sum of squares of errors between the true value of the considered pixel and the predicted value becomes minimum when the predicted value of the considered pixel is generated by linear combination of a plurality of pixels of the first digital image signal and the predicted coefficients.

As a third aspect of the present invention, instead of predicted coefficients, representative values for each class are used as a predicted value of the second digital image signal.

As a fourth aspect of the present invention, a class categorizing process is performed corresponding to the pattern of the level distribution of one-dimensional, two-dimensional, or three-dimensional pixel arrangement of the first digital image signal. When the pattern of the level distribution is obtained, the number of bits is compressed by a compressing and encoding technique.

DESCRIPTION OF THE PREFERRED EMBODIMENTS

Figure 1:
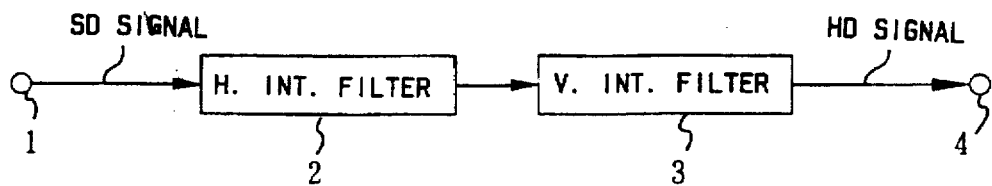
FIG. 1 is a block diagram showing a conventional image signal converting apparatus.
Figure 2:
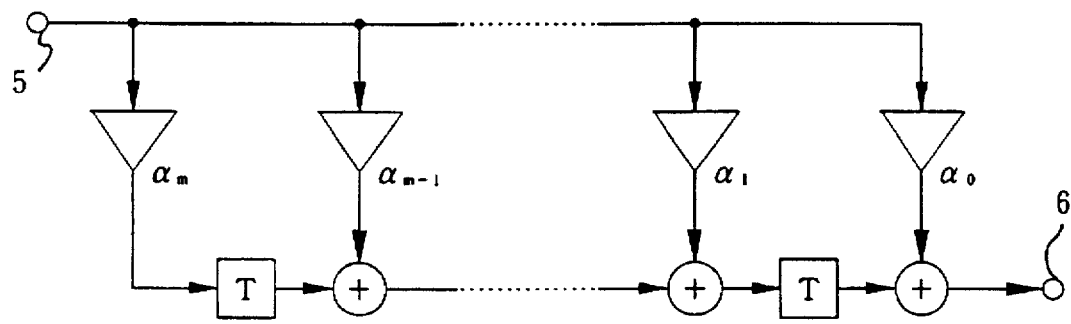
FIG. 2 is a block diagram showing an interpolating filter of FIG. 1.
Figure 3:
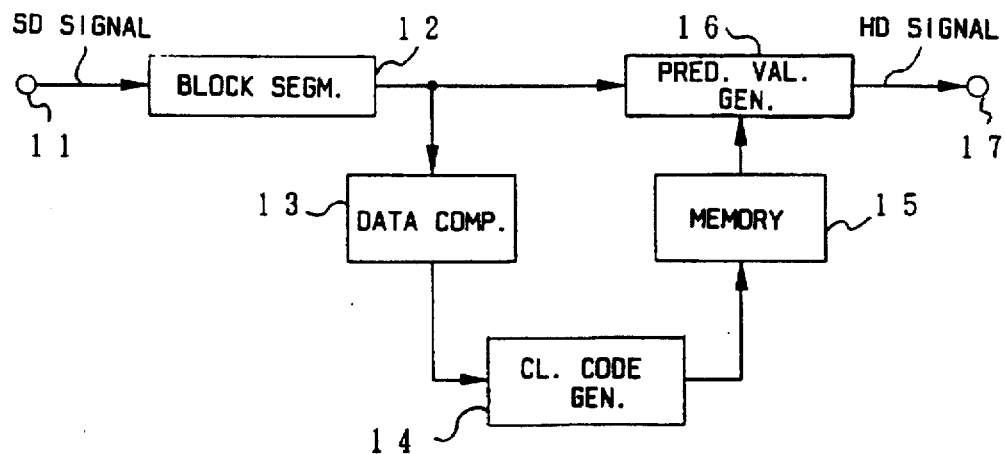
FIG. 3 is a block diagram showing an image signal converting apparatus according to a first embodiment of the present invention.

Next, with reference to the accompanying drawings, preferred embodiments of the present invention will be described. FIG. 3 shows the construction of an embodiment of the present invention. Reference numeral 11 is an input terminal to which an SD signal is supplied. The SD signal is, for example, a NTSC digital video signal with a predetermined sampling frequency. One pixel of the SD signal is composed of eight bits. The input SD signal is sent to a block segmenting circuit 12 that converts raster scanning sequence data into one-dimensional, two-dimensional, or three-dimensional block sequence data.

The output of the block segmenting circuit 12 is sent to a data compressing circuit 13 and a predicted value generating circuit 16. The output of the data compressing circuit 13 is sent to a class code generating circuit 14. The output of the class code generating circuit 14 is an address signal and sent to a memory 15. The memory 15 stores predicted coefficients that have been learnt. The predicted coefficients stored in the memory 15 are supplied to a predicted value generating circuit 16.

The data compressing circuit 13 and the class code generating circuit 14 categorize a considered pixel to be predicted as a class corresponding to a pattern of level distribution of each block containing the considered pixel. The output of the class code generating circuit 14 is a class code that represents the determined class. Although the considered pixel is categorized as a class corresponding to the SD signal, if a plurality of pixels (eight bits of pixels adjacent to the considered pixel) of the SD signal are referenced (these pixels are referred to as SD pixels), the class number becomes large. To prevent the class number from becoming large, the data compressing circuit 13 is provided. The data compressing circuit 13 compresses the number of bits of the adjacent pixels to be referenced (namely, referenced pixels). An example of the data compressing circuit 13 is an ADRC circuit.

To compress data, various techniques such as DCT (Discrete Cosine Transform), VQ (Vector Quantizing), DPCM (Differential Pulse Code Modulation), BCT (Block Truncation Coding), and non-linear quantizing may be selectively used as well as the ADRC (Adaptive Dynamic Range Coding) technique.

Figure 4:
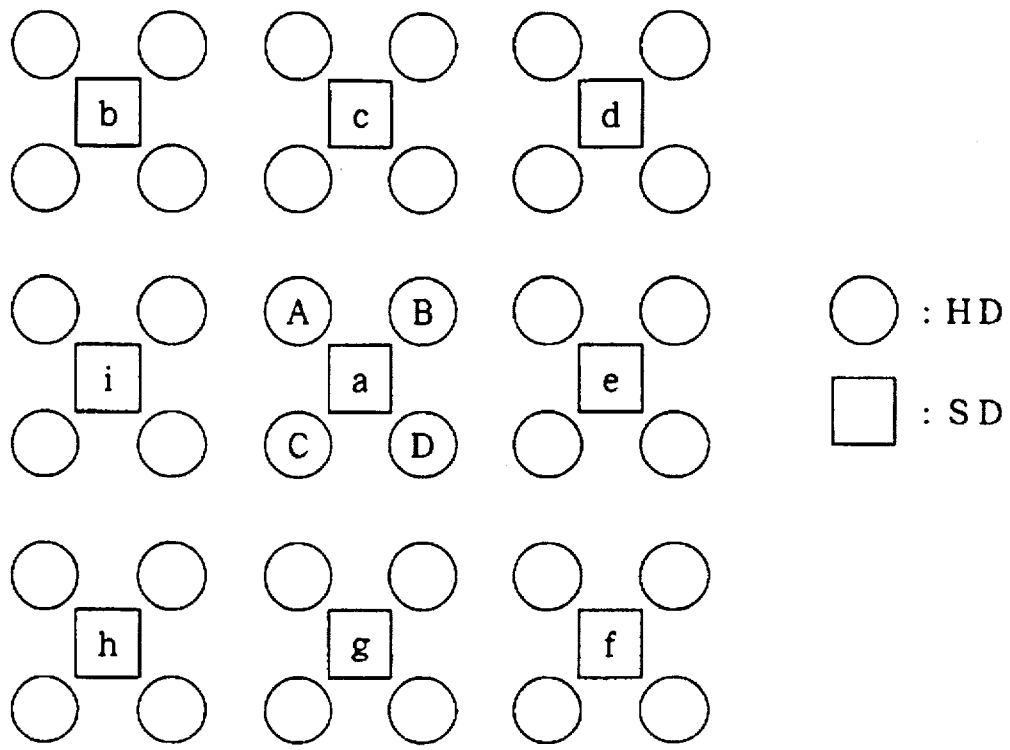
FIG. 4 is a schematic diagram showing a two-dimensional arrangement of pixels of an SD signal and an HD signal.

As shown in FIG. 4, the block segmenting circuit 12 converts raster scanning sequence data of the TV signal into two-dimensional block sequence data. In the example shown in FIG. 4, one block is composed of (3×3) SD pixels denoted by a to i. The predicted value generating circuit 16 generates the values of four HD pixels A to D nearly at the center of the block corresponding to the SD pixels of the block.

Figure 5:
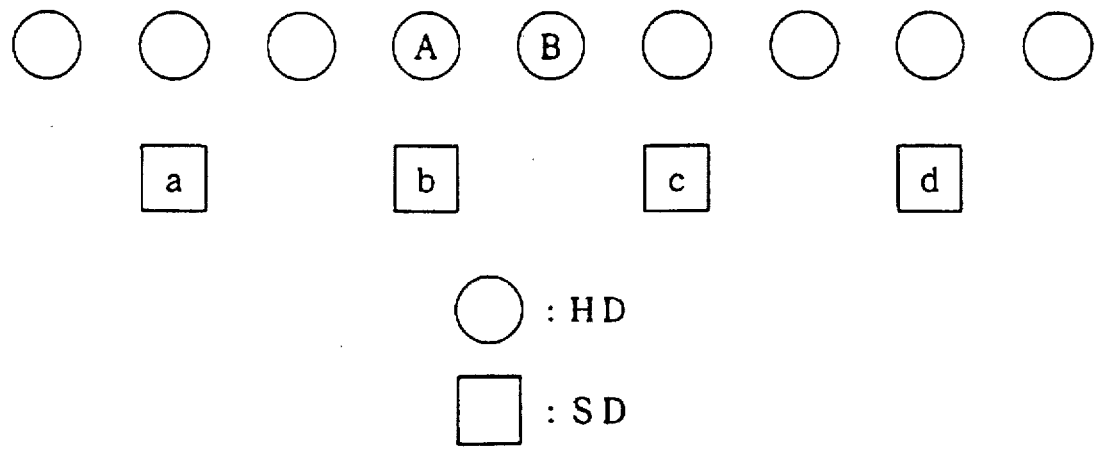
FIG. 5 is a schematic diagram showing a one-dimensional arrangement of pixels of an SD signal and an HD signal.

Instead of the block shown in FIG. 4, the predicted value generating circuit 16 may generate predicted values of HD pixels corresponding to a one-dimensional block of four SD pixels a to d as shown in FIG. 5. Moreover, the present invention may be applied to a three-dimensional block that will be described later.

In the one-dimensional arrangement shown in FIG. 5, the HD pixel A is categorized as a class and a predicted value thereof is generated corresponding to the SD pixels a, b, and c. The HD pixel B is categorized as a class and a predicted value thereof is generated corresponding to the SD pixels a, b, c, and d. Likewise, the class categorizing process and a predicted value generating process apply to the learning operation.

Figure 6:
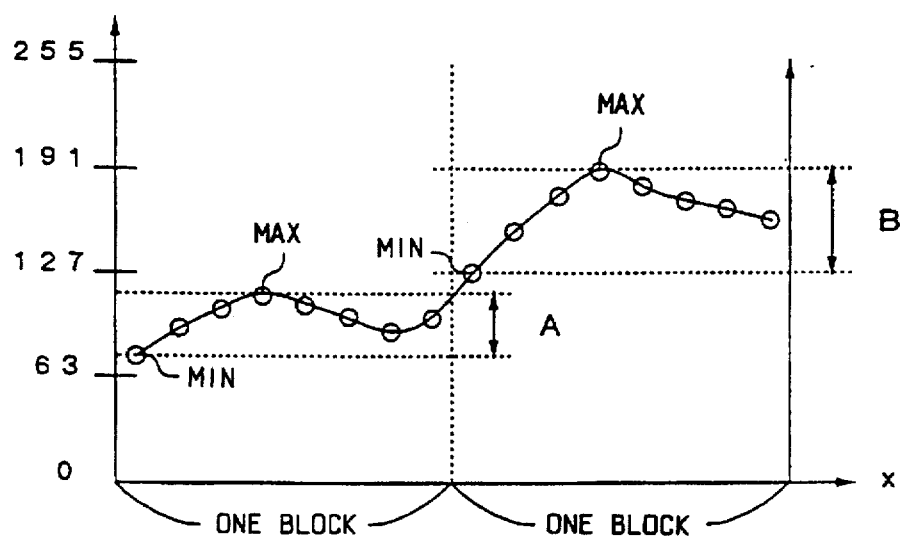
FIG. 6 is a graph for explaining a change of a signal level in ADRC.

Next, the ADRC technique used for the data compressing circuit 13 will be described. In the ADRC technique, redundancy of level is adaptively removed corresponding to the correlation of local features of pixels. As shown in FIG. 6, it is clear that dynamic ranges A and B in each block that is re-quantized are much smaller than the original dynamic range of 0 to 255 of the original data composed of eight bits. Thus, the number of bits necessary for re-quantizing these blocks is much smaller than the eight bits.

Figure 7:
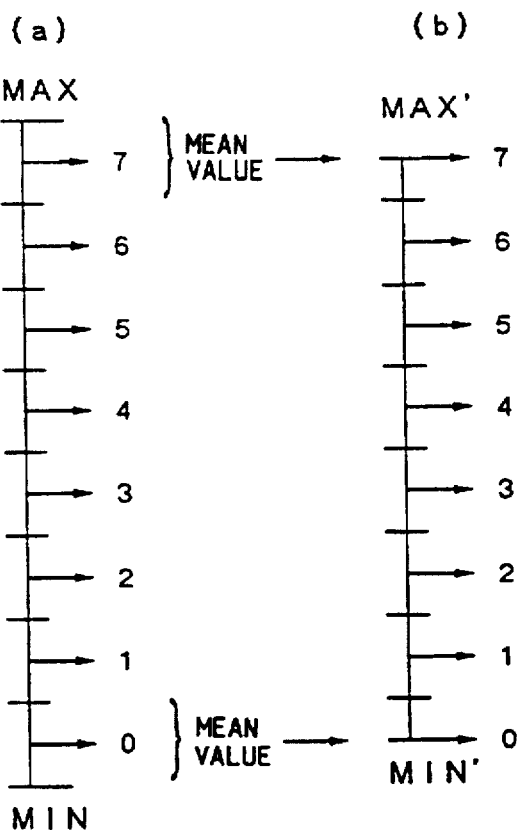
FIG. 7 is a schematic diagram for explaining quantizing characteristics in ADRC.

Now, assume that the number of assigned bits that is smaller than the number of original bits (eight bits) is p, the dynamic range of a block is DR, the value of a pixel in the block is x, and a re-quantized code is Q. With equation (1), the level between maximum value MAX and minimum value MIN is equally divided into $2^P$ portions and then re-quantized. FIG. 7(a) shows a re-quantizing operation of a level where p is 3.

$$DR = MAX - MIN + 1$$
$$Q = [(x - MIN + 0.5) \times 2^P / DR] \quad (1)$$

where [z] represents the maximum integer, that is, z or less.

Next, the mean value of pixels in the block having the data level equivalent to $(2^P - 1)$ in the p-bit re-quantizing graduation level in FIG. 7(a) is calculated. The calculated result is a new maximum value MAX'. The mean value of the pixels in the block having the data level equivalent to the re-quantizing graduation level 0 is a new minimum value MIN'. With the new maximum value MAX' and the new minimum value MIN', the dynamic range is defined. With equation (2), the re-quantizing operation is performed.

$$DR'=MAX'-MIN'$$

$$q=[(x-MIN')\times(2^P-1)/DR'+0.5] \quad (2)$$

where [z] represents the maximum integer, that is, z or less.

In the ADRC technique where the new maximum value MAX', the minimum value MIN', and the dynamic range DR' are re-defined, the information amount can be effectively compressed. The compressed result is not affected by noise.

As a quantizing operation corresponding to the ADRC technique, the representative level being restored may have the same level as the maximum value MAX and the minimum value MIN.

As an example of a two-dimensional block, corresponding to the above-described ADRC technique, values of n pixels where eight bits with values a to i have been compressed to p bits are sent to the class code generating circuit 14. Thus, a code class representing class c is generated corresponding to equation (3).

$$\text{class} = \sum_{i=1}^{n} q_i (2^p)^i \quad (3)$$

Figures 8, 9:
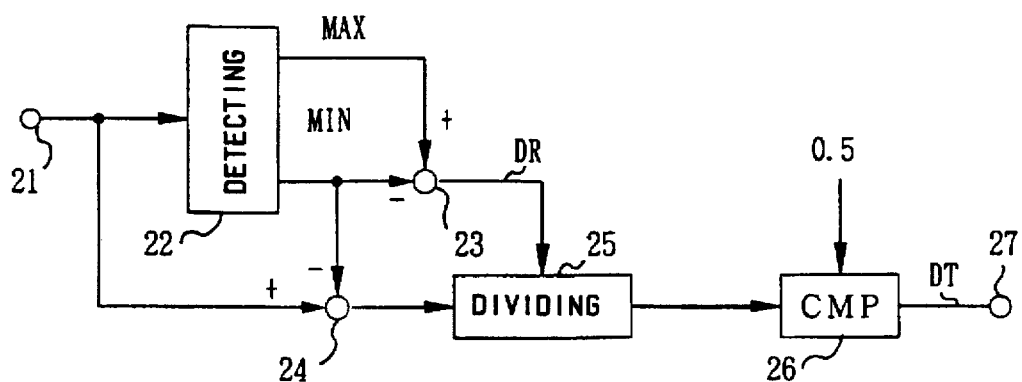
FIG. 8 is a block diagram showing an encoding circuit corresponding to one-bit ADRC technique.
FIG. 9 is a table showing SD pixels used in predicting values of a plurality of HD pixels.

Next, with reference to FIG. 8, an ADRC circuit corresponding to the one-bit ADRC technique of will be described. In FIG. 8, a block sequence data is supplied to an input terminal 21. The block sequence data is sent to a detecting circuit 22 that detects the maximum value MAX and the minimum value MIN of pixels for each block. The MAX and MIN are sent to a subtracting circuit 23. The output of the subtracting circuit 23 is a dynamic range DR. In addition, the input data and the MIN are sent to a subtracting circuit 24. Since the subtracting circuit 24 subtracts the MIN from the input data, the output thereof is normalized pixel data.

The dynamic range DR is sent to a dividing circuit 25 that divides the normalized pixel data by the dynamic range DR. The output of the dividing circuit 25 is sent to a comparing circuit 26. The comparing circuit 26 determines whether each of the divided outputs of nine pixels is larger than 0.5. The output of the comparing circuit 26 is one-bit data DT whose value is 0 or 1. When the divided output is larger than 0.5, the value of data DT is 1. Otherwise, the value of data DT is 0. The data DT is sent to an output terminal 27. Corresponding to the one-bit ADRC technique, a block of (3×3) SD pixels can be categorized as a 9-bit class code.

Returning to FIG. 3, predicted coefficients corresponding to the class code are read from the memory 15. The predicted value generating circuit 16 generates a predicted value y' of an HD pixel corresponding to linear combination of SD data of each block supplied from the block segmenting circuit 12 and the predicted coefficients $w_1$ to $w_n$. The linear combination is given by equation (4).

$$y'=w_1x_1+w_2x_2+\ldots+w_nx_n \quad (4)$$

In the example shown in FIG. 4, (n=1, 2, . . . 9). In the relation shown in FIG. 9, predetermined SD data are denoted by x1 to x9.

In other words, when predicted values for four HD pixels A to D of one block are generated, SD pixels for the predicted coefficients are changed corresponding to the considered HD pixels. When the pixel A is a considered HD pixel, the predicted value of the pixel A is generated corresponding to equation (5).

$$y'=w_1a+w_2b+w_3c+\ldots+w_ni \quad (5)$$

When the pixel B is a considered HD pixel, the predicted value of the pixel B is generated corresponding to equation (6).

$$y'=w_1a+w_2d+w_3c+\ldots+w_ne \quad (6)$$

Thus, coefficients for generating predicted values of four HD pixels of the same block (namely, the same class) can be used in common. Thus, the storage capacity of the memory 15 can be reduced and the number of times access to the memory 15 can be decreased. The relation between the values $x_1$ to $x_9$ multiplied by the coefficients shown in FIG. 9 and the SD pixels a to i is defined corresponding to the distance between a considered HD pixel and SD pixels.

$x_1$ to $x_9$ may be considered as nine bits of a class code formed by the one-bit ADRC technique. In other words, the classes for the HD pixels A to D in the vicinity of the center of one block can be defined by changing the sequence of the values where the SD pixels a to i have been compressed and encoded. These values can be read from the memory by a different reading sequence.

Figure 10:
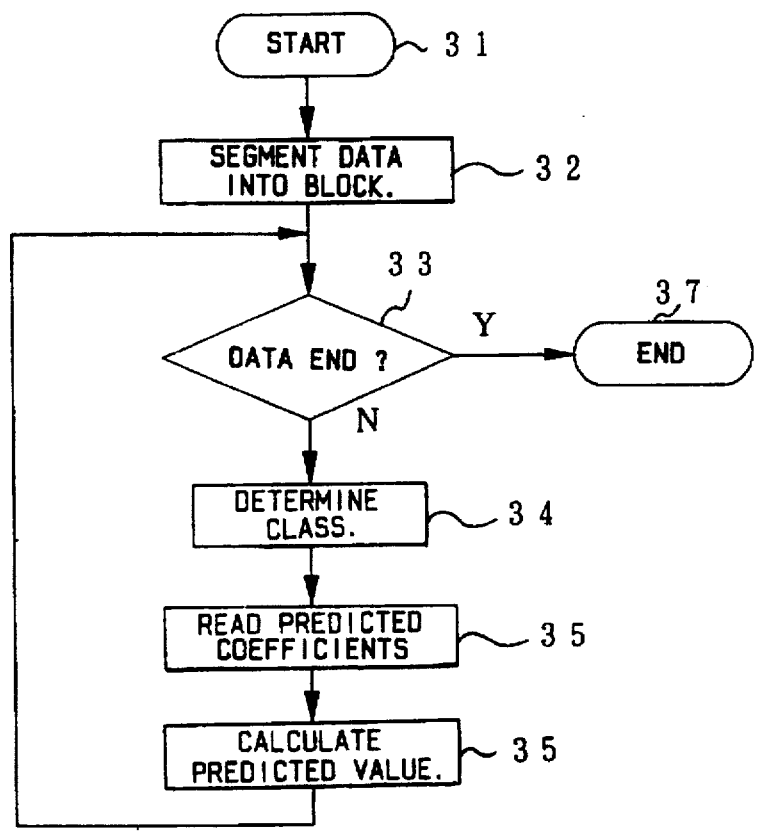
FIG. 10 is a flow chart for explaining a process of an embodiment of the present invention.

FIG. 10 is a flow chart showing an up-converting process where an SD signal is converted into an HD signal according to the present invention. At step 31 "START", the control of the up-converting process is started. At step 32 "SEGMENT DATA INTO BLOCK", an SD signal is supplied. At this step, SD pixels are extracted for each block as shown in FIG. 4. At step 33 "DATA END ?", if all input data has been completely processed, the flow advances to step 37 "END". Otherwise, the flow advances to step 34 "DETERMINE CLASS".

At step 34 "DETERMINE CLASS", a class is determined corresponding to a pattern of distribution of the signal level of the SD signal. For example, a class is determined corresponding to data compressed by, for example, the one-bit ADRC technique. At step 35, predicted coefficients corresponding to the class code are read from the memory. At step 36 "CALCULATE PREDICTED VALUE", the calculation is performed corresponding to the equation (4) and the predicted value y' of the HD pixel is output. The sequence of these steps is repeated for all data. When all data has been completely processed, the flow advances from step 33 "DATA END" to step 37 "END". Thus, the up-converting process is completed.

Figure 11:
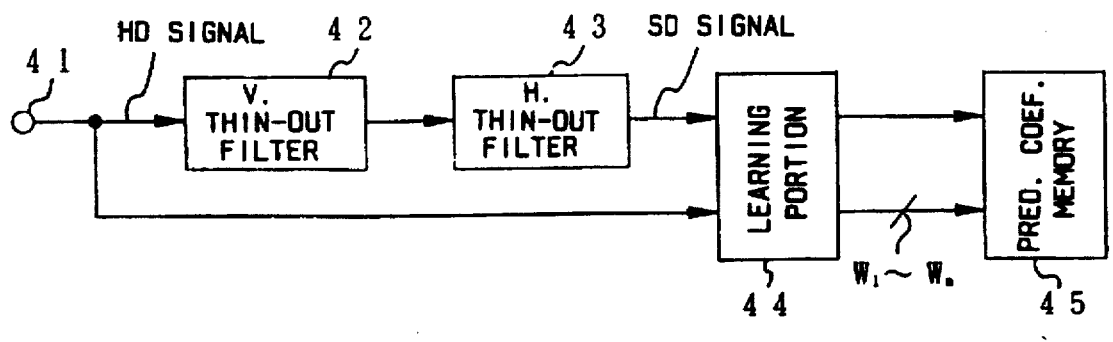
FIG. 11 is a block diagram schematically showing a construction of a circuit block for a learning process for determining predicted coefficients.

As described above, the memory 15 stores the predicted coefficients that have been learnt. Next, the learning process will be described. FIG. 11 is a block diagram showing a circuit block for performing the learning process according to an embodiment of the present invention.

Reference numeral 41 is an input terminal into which a standard HD signal, that is, a large number of still images, is supplied. The HD signal is sent to a filter 42 and a learning portion 44. The vertical thin-out filter 42 thins out the HD signal in the vertical direction so as to reduce by half the number of pixels of the HD signal in the vertical direction. The output of the vertical thin-out filter 42 is sent to a horizontal thin-out filter 43. The horizontal thin-out filter 43 thins out the HD signal in the horizontal direction so as to reduce by half the number of pixels of the HD signal in the horizontal direction. Thus, an image signal with pixels, like an SD signal, is sent to a learning portion 44. A predicted coefficient memory 45 stores predicted coefficients $w_1$ to $w_n$ at an address corresponding to the class determined by a class categorizing circuit in the learning portion 44.

The method for forming an SD signal from an HD signal is not limited to the above-described method where the thin-out filters are used. Instead, as in the pixel arrangement shown in FIG. 4, the value of an SD pixel a may be formed by the mean value of (2×2) pixels (for example, A, B, C, and D). Alternatively, unlike with such a simple mean value, a weight mean value of HD pixels in a wide range (for example, HD pixels in one block) may be used for an SD pixel.

As in the arrangement shown in FIG. 4, when one block is composed of (3×3) SD pixels, the SD pixels a to i and the HD pixels A, B, C, and D become one set of learnt data. When there are many sets of learnt data for one frame and the number of frames is increased, a large number of sets of learnt data can be used.

Figure 12:
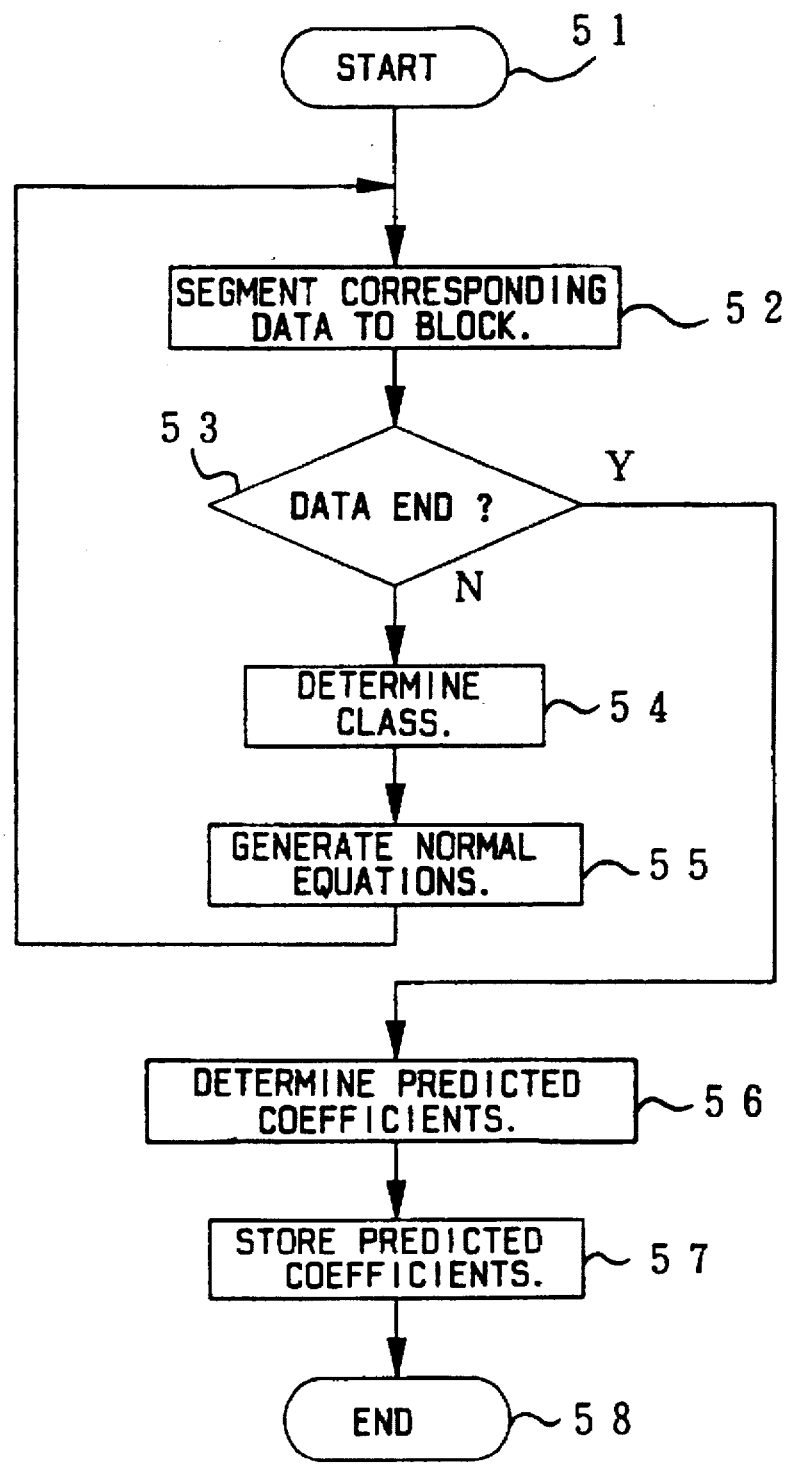
FIG. 12 is a flow chart for explaining a learning process.

The learning portion 44 performs both a class categorizing process and a calculating process. As the class categorizing process, the learning portion 44 compresses the SD pixels a to i and categorizes the pattern of the two-dimensional distribution of the values of the compressed SD pixels as a class. As the calculating process, the learning portion 44 determines predicted coefficients of each class corresponding to the method of least squares. The class categorizing process performed by the learning portion 44 is the same as the process performed by the data compressing circuit 13 and the class code generating circuit 14 shown in FIG. 3. This learning portion 44 may be accomplished by software. FIG. 12 is a flow chart showing the process of software for the learning portion 44.

At step 51, the control of the learning portion 44 is started. At step 52 "SEGMENT CORRESPONDING DATA INTO BLOCK", an HD signal and an SD signal are supplied and a process for extracting the HD pixels (A to D) and the SD pixels (a to i) in the arrangement shown in FIG. 4 is performed. At step 53 "DATA END ?", if data process for all data (for example, one frame) has been completed, the flow advances to step 56 "DETERMINE PREDICTED COEFFICIENTS". Otherwise, the flow advances to step 54 "DETERMINE CLASS".

At step 54 "DETERMINE CLASS", a class is determined corresponding to the pattern of the level distribution of the SD pixels (a to i) in the vicinity of the HD pixels (A to D of FIG. 4) to be predicted. In this process, as described above, so as to reduce the number of bits, the SD pixels are compressed by, for example, the ADRC technique. At step 55 "GENERATE NORMAL EQUATIONS", equations (12), (13), and (14), which will be described later, are generated.

At step 53 "DATA END ?", it is determined whether all data has been completely processed. When all data has been completely processed, the flow advances to step 56. At step 56 "DETERMINE PREDICTED COEFFICIENTS", example (14), which will be described later, is solved by matrix solution so as to determine predicted coefficients. At step 57 "STORE PREDICTED COEFFICIENTS", the predicted coefficients are stored in the memory. At step 58 "END", the sequence of the steps of the process of the learning portion 44 is completed.

Like the above-described signal converting apparatus, with the pixel arrangement shown in FIG. 4, the SD pixels a to i are compressed and encoded. The encoded values are categorized as a class. Predicted values of the HD pixels A to D are generated by linear combination of the values of the SD pixels a to i and the predicted coefficients $w_1$ to $w_n$ with a combination shown in FIG. 9.

Next, the process for extracting predicted coefficients for HD pixels from the values of SD pixels will be described in detail. Assume that the values of SD pixels are $x_1$ to $x_n$ and the true value of the considered HD pixel is y. For each class, a linear combination of n taps (coefficients $w_1$ to $w_n$) is given by the following equation.

$$y' = w_1 x_1 + w_2 x_2 + \ldots + w_n x_n \tag{7}$$

In equation (7), before the learning process is performed, $w_i$ is an unknown coefficient.

As described above, the learning process is performed for a plurality of HD data and a plurality of SD data for each class. When the number of data is m, equation (7) is modified to equation (8).

$$y_j' = w_1 x_{j1} + w_2 x_{j2} + \ldots + w_n x_{jn} \tag{8}$$

where j=1, 2, ..., m. When m>n, since $w_1$ to $w_n$ are not unique values, elements of an error vector are defined as follows.

$$e_j = y_j - (w_1 x_{j1} + w_2 x_{j2} + \ldots + w_n x_{jn}) \tag{9}$$

where j=1, 2, ..., m. Coefficients that minimize the following equation are obtained.

$$E^2 = \sum_{j=0}^{m} (e_j)^2 \tag{10}$$

In other words, the method of least squares is used. Partial differential coefficients are obtained with respect to $w_i$ of equation (10).

$$\frac{\partial E^2}{\partial w_i} = \sum_{j=0}^{m} 2\left(\frac{\partial e_j}{\partial w_i}\right) e_j = \sum_{j=0}^{m} 2 x_{ij} \cdot e_j \tag{11}$$

$w_i$ is obtained so that the value of equation (11) becomes 0. Thus, assume $$X_{ij} = \sum_{p=0}^{m} X_{pi} \cdot X_{pj} \tag{12}$$

$$Y_i = \sum_{j=0}^{m} X_{ji} \cdot y_j \tag{13}$$

The equations (12) and (13) can be expressed with a matrix.

$$\begin{bmatrix} X_{11} & X_{12} & \ldots & X_{1n} \\ X_{21} & X_{22} & \ldots & X_{2n} \\ \cdot & \cdot & & \cdot \\ \cdot & \cdot & & \cdot \\ \cdot & \cdot & & \cdot \\ X_{n1} & X_{n2} & \ldots & X_{nn} \end{bmatrix} \begin{bmatrix} W_1 \\ W_2 \\ \cdot \\ \cdot \\ \cdot \\ W_n \end{bmatrix} = \begin{bmatrix} Y_1 \\ Y_2 \\ \cdot \\ \cdot \\ \cdot \\ Y_n \end{bmatrix} \tag{14}$$

Using a conventional matrix solution method, such as the sweeping-out method, the predicted coefficient $w_i$ can be solved. The predicted coefficient $w_i$ is stored in the memory with an address of a class code.

Thus, the learning portion 44 can determine the predicted coefficient $w_i$ with the HD signal, that is, real data. The predicted coefficient $w_i$ is stored in the memory. The predicted coefficients determined by the learning portion 44 are stored in the memory 15 shown in FIG. 3.

The class categorizing process and the predicted value generating process of the above-described embodiment are performed corresponding to the values of SD pixels that are one-dimensionally or two-dimensionally arranged. Next, the class categorizing process corresponding to the values of SD pixels that are three-dimensionally arranged will be described. When SD pixels that are three-dimensionally arranged are used, chronological information can be used for the class categorizing process and the predicted value generating process. In addition, in the case of the interlace scanning TV signal, since line distance in a field is large, the predicting accuracy of the process of the field can be prevented from lowering.

In the conventional signal converting apparatus, to use moving information, the motion of an image is detected. Moving pixels are processed in a field, whereas still pixels are processed among fields. The output signal of each process is mixed with a coefficient corresponding to the amount of motion. Thus, in the conventional apparatus, a motion detecting circuit is additionally required. In addition, unless the motion is accurately detected, image deterioration tends to occur. The class categorizing process and the predicted value generating process using SD pixels that are three-dimensionally arranged can solve such problems.

As described above, the class categorizing process and the predicted value generating process for the signal converting apparatus, which converts an SD signal into an HD signal, are the same as these processes for the learning portion. Next, the class categorizing process and the predicted value generating process for SD pixels that are three-dimensionally arranged will be described. First, the relation of positions of lines of an HD signal and an SD signal will be explained.

Figure 13:
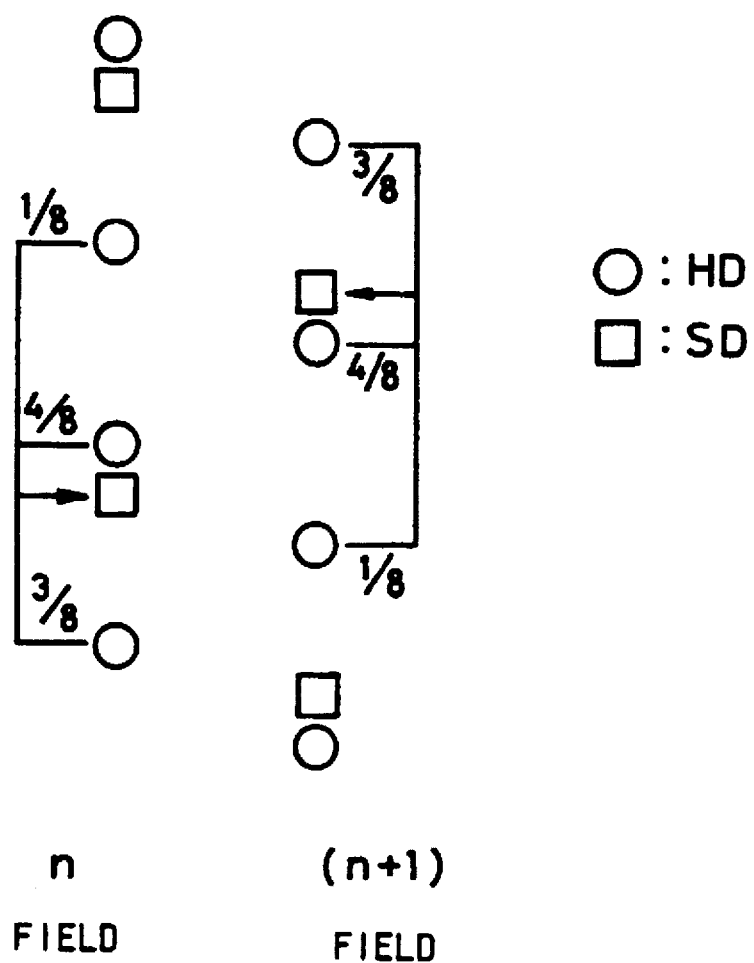
FIG. 13 is a schematic diagram showing the relation of vertical positions of SD pixels and HD pixels in interlace scanning.
Figure 14:
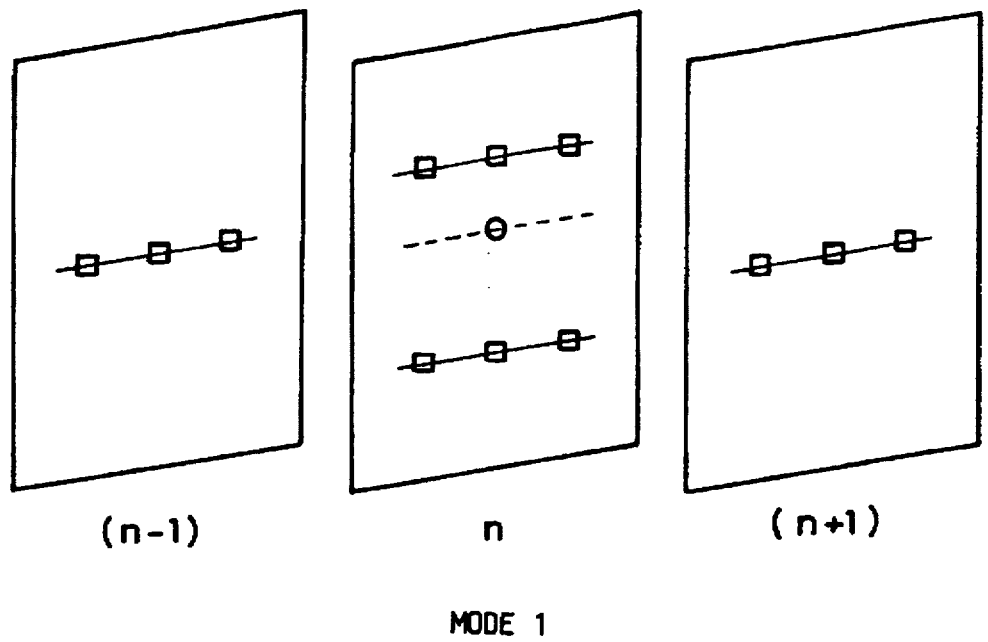
FIG. 14 is a schematic diagram showing an arrangement of SD pixels in mode 1.

As with the learning process, when an HD signal is converted into an SD signal, pixels on three successive lines of the HD signal are multiplied by non-symmetrical coefficients such as ⅛, 4/8, and ⅜; as shown in FIG. 13, one line of the SD signal is formed. These non-symmetrical coefficients are used in the reverse order for each field so as to maintain the interlace structure of the SD signal. In other words, if two lines of the HD signal are combined and one line of an SD image is formed, since the intervals of lines in the n-th field do not accord with the intervals of lines in the (n+1)-th field, the interlace structure will be lost.

For the class categorizing process and the predicted value generating process, for example, 12 SD pixels that are three-dimensionally distributed are used. There are four patterns of 12 SD pixels corresponding to the position of one HD pixel to be predicted. These four patterns are referred to as mode 1, mode 2, mode 3, and mode 4. FIGS. 14, 15, 16, and 17 show arrangements of pixels corresponding to mode 1, mode 2, mode 3, and mode 4, respectively. In FIGS. 14 to FIG. 17, circles represent HD pixels to be predicted and squares represent SD pixels to be used for class categorizing process and predicted value generating process.

Figure 15:
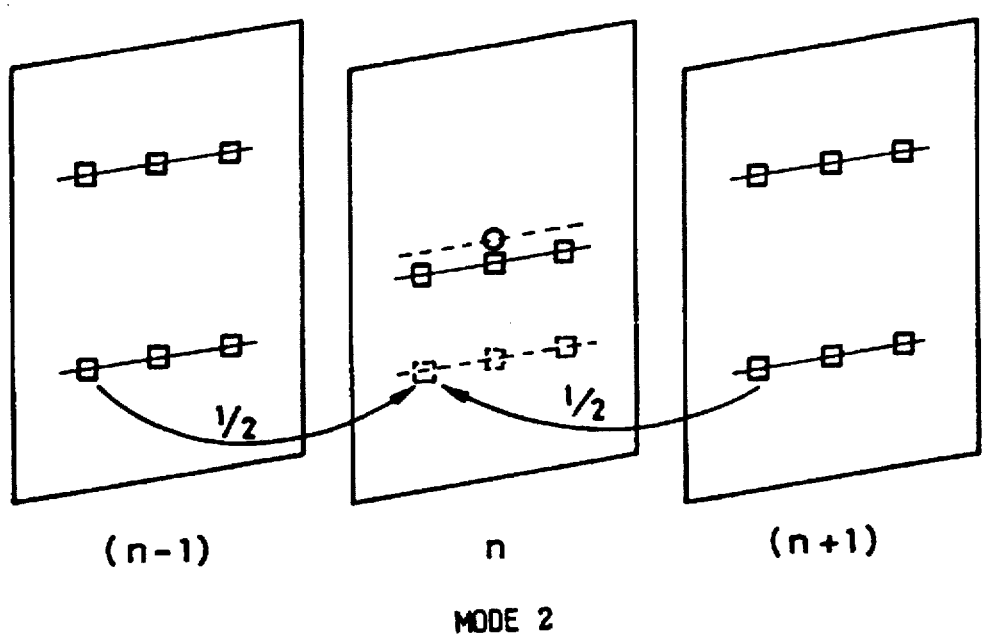
FIG. 15 is a schematic diagram showing an arrangement of SD pixels in mode 2.
Figure 16:
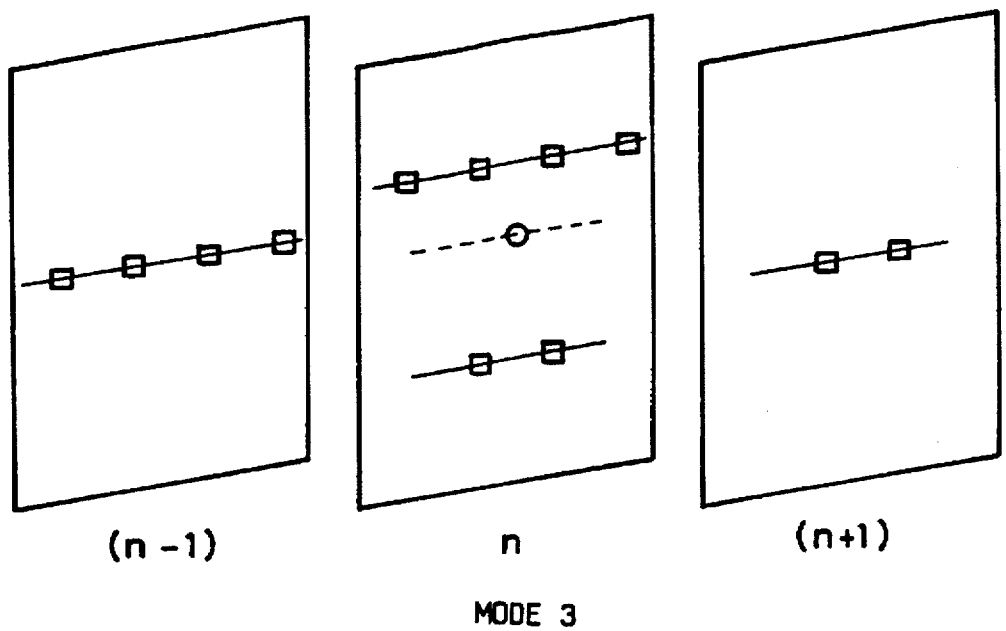
FIG. 16 is a schematic diagram showing an arrangement of SD pixels in mode 3.
Figure 17:
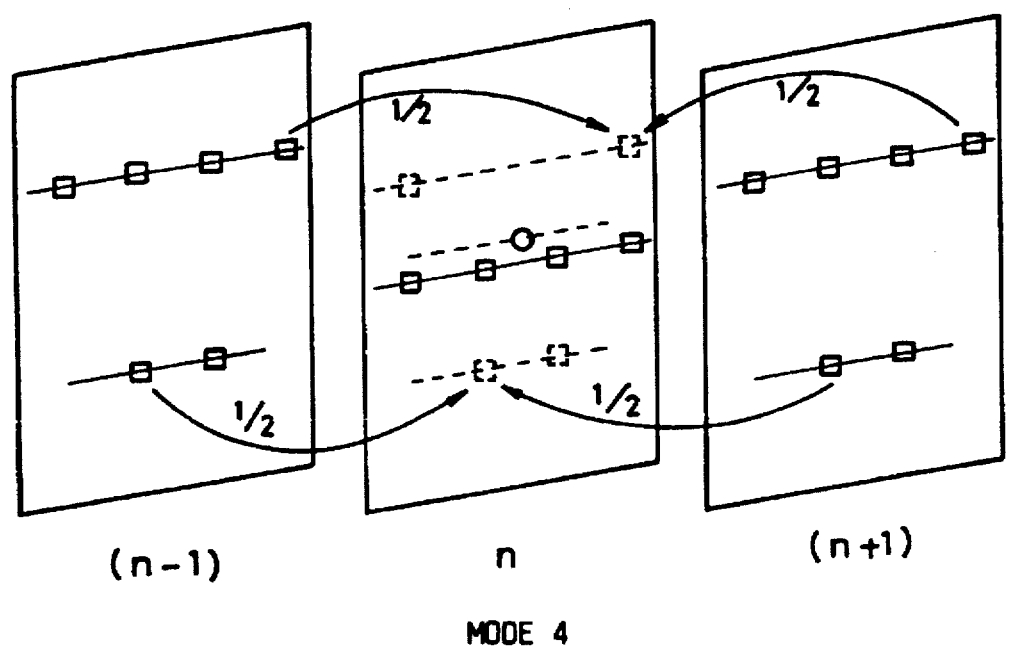
FIG. 17 is a schematic diagram showing an arrangement of SD pixels in mode 4.

For the simplicity of hardware, in FIGS. 15 and 17, SD pixels in the (n−1)-th field and the (n+1)-th field are partially averaged so as to form SD pixels in the n-th field. The SD pixels in the n-th field are denoted by squares with dotted lines. FIGS. 14, 15, 16, and 17 each show a plurality of SD pixels and one HD pixel where the SD pixels are used for the class categorizing process and the predicted value generating process and the HD pixel is to be predicted.

In mode 1 (arrangement shown in FIG. 14), six SD pixels in the n-th field, three SD pixels in the (n−1)-th field, and three SD pixels in the (n+1)-th field (a total of 12 SD pixels) are used to perform the class categorizing process and the predicted value generating process for an HD pixel. In mode 1, an HD pixel on the line where a coefficient of ⅛ is multiplied is predicted (see FIG. 13).

In mode 2 (arrangement shown in FIG. 15), SD pixels on the same line in the (n−1)-th field and the (n+1)-th field are averaged so as to interpolate three SD pixels that are required in the n-th field. The six SD pixels including the interpolated SD pixels in the n-th field, three SD pixels other than SD pixels used for averaging in the (n−1)-th field, and three SD pixels other than SD pixels used for averaging in the (n+1)-th field are used. Thus, a total of 12 SD pixels are used. In mode 2, an HD pixel on the line where a coefficient of 4/8 is multiplied is predicted (see FIG. 13).

In mode 3 (arrangement of FIG. 16), six SD pixels in the n-th field, four SD pixels in the (n−1)-th field, and two SD pixels in the (n+1)-th field (a total of 12 SD pixels) are used. In mode 3, an HD pixel on the line where a coefficient of ⅛ is multiplied is predicted (see FIG. 13).

In mode 4 (arrangement of FIG. 17), SD pixels in the (n−1)-th field and (n+1)-th field are averaged so as to interpolate four SD pixels (two pixels each on two lines) that are required in the n-th field. The eight SD pixels including the interpolated SD pixels in the n-th field, two SD pixels other than the SD pixels used for averaging in the (n−1)-th field, and two SD pixels other than the SD pixels used for averaging in the (n+1)-th field are used. Thus, a total of 12 SD pixels are used. In mode 4, an HD pixel on the line where a coefficient of 4/8 is multiplied is predicted (see FIG. 13).

As described above, in modes 3 and mode 4, an HD pixel is generated at the ½ position of the sampling intervals of SD pixels. In other words, in mode 1 to mode 4, an HD pixel with horizontal and vertical resolutions that are twice those of an SD pixel is generated.

Figure 18:
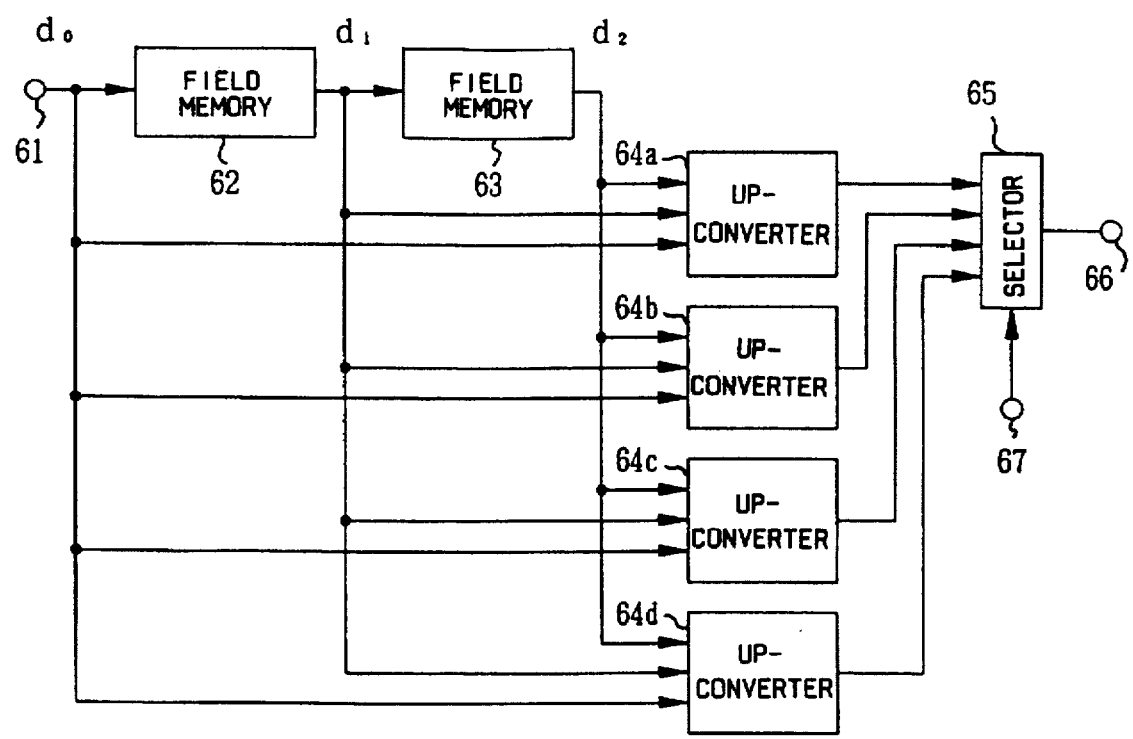
FIG. 18 is a block diagram showing an apparatus for converting an image signal corresponding to predicted coefficients of each mode.

In the learning process, predicted coefficients of each of mode 1 to mode 4 are determined by the method of least squares for each class and stored in the memory. FIG. 18 shows a construction of a signal converting apparatus that generates an output HD image corresponding to an input SD image.

A signal $d_0$, that is, an SD image in the (n+1)-th field, is supplied to an input terminal 61. The $d_0$ signal is sent to a field memory 62 and up-converting circuits 64a to 64d. The field memory 62 outputs an SD image signal in n-th field. This signal is denoted by signal $d_1$. The signal $d_1$ is sent to the up-converting circuits 64a to 64d. The field memory 63 outputs an SD image signal in the (n−1)-th field. This signal is referred to as signal $d_2$. The signal $d_2$ is sent to the up-converting circuits 64a to 64d.

An HD image is formed corresponding to signals $d_0$, $d_1$, and $d_2$ of the SD image sent to the up-converting circuits 64a to 64d. The up-converting circuits 64a to 64d perform signal conversions of the above-described mode 1 to mode 4. A selector 65 is controlled with a select signal received from an input terminal 67. The select signal is a signal that designates a mode of a considered pixel. The output of the selected up-converting circuit is sent to an output terminal 66.

The up-converting circuits 64a to 64d in FIG. 18 has the same construction except that predicted coefficients stored therein differ from each other. Essentially, excepting that SD signals in three chronologically successive fields are supplied to a block segmenting circuit and a three-dimensional block is formed, the construction of the up-converting circuits 64a to 64d is the same as the construction of the circuit block shown in FIG. 3.

In the above-described embodiment, by learning the relation between a known HD signal and an SD signal formed thereof, predicted coefficients for each class are determined. With the predicted coefficients and an input SD signal, an HD signal is generated. Thus, the resolution of the HD signal is compensated. In addition, since a class is adaptively selected corresponding to the distribution of the level of the SD signal, the SD signal can be up-converted corresponding to local characteristics of the image.

Moreover, a class is determined corresponding to the three dimensional (chronological) distribution of the level of an input SD signal. The SD signal is converted corresponding to predicted coefficients that have been determined and learnt for each class. Thus, since chronological information can be effectively used, a converting image signal can be accurately output for a moving image. Furthermore, since the chronological information can be effectively used, an interlace signal can be effectively converted.

In the above-described embodiment, the same SD pixels are used for both the class categorizing process and the predicted value generating process. However, it is not necessary to do so. For example, part of SD pixels used for the predicted value generating process may be used for the class categorizing process.

When an HD signal is predicted, besides linear combination of a plurality of SD pixels and predicted coefficients, the values of pixels of the HD signal or normalized values thereof (referred to as representative values) may be predetermined by the learning process and these values may be stored in memory.

Next, a second embodiment of the present invention will be described. In this embodiment, normalized values of pixels of an HD signal are used. As with the first embodiment of the present invention, a class is determined corresponding to a pattern of a one-dimensional distribution, two-dimensional distribution, or three-dimensional distribution of SD pixels. Predicted values of each class are learnt and determined. For example, in the case of SD pixels that are two-dimensionally arranged as shown in FIG. 4, SD pixels that are used for the class categorizing process for HD pixels A to D of a block are selected in the relation shown in FIG. 9.

As an example, assume that one of HD pixels A to D that are two-dimensionally distributed is considered as shown in FIG. 4. In addition, assume that the cumulated value of learnt data of class c at the present time is SU(c) and the number of times of cumulation is n(c). The arithmetic operations given by equation (15) are repeatedly performed for the learnt data.

$$SU(c)=(hd-\text{base})/DR$$
$$n(c)=n(c)+1 \quad (15)$$

where hd is the true value of an HD pixel of the learnt data, base is a base value of the block, and DR is a dynamic range of the block. The base value may be selected from the minimum value of the SD pixels in the block, the value of the SD pixel that is most close to the considered HD pixel, the value of the SD pixel at a predetermined position in the block, the simple mean value (weighted mean value) of the values of the SD pixels in the block, or the like. The value of the center of gravity g (normalized value) is obtained by equation (16).

$$g(c)=SU(c)/n(c) \quad (16)$$

The value of the center of gravity g(c) may be directly obtained by equation (17).

$$n(c)=n(c)+1$$

$$g(c)=\{(hd-\text{base})/DR+(n(c)-1)\times g(c)\}/n(c) \quad (17)$$

Equation (16) represents the process for successively storing the values of the center of gravity obtained in the memory. On the other hand, equation (17) represents the process for storing the cumulated value of the former values of center of gravity in the memory and for dividing the total of the cumulated value and the present value of center of gravity by the number of times of cumulation. As described above, equations (16) and (17) represent the process for cumulating values normalized with the base value base and the dynamic range DR rather than the true value hd of the HD pixel. When the cumulated value for each class is stored in the memory and the cumulated value is divided by the number of times of cumulation, representative values may be obtained. However, since the cumulated value becomes large, the number of bits of the memory may increase.

The value of the center of gravity that has been determined and learnt is used for the signal converting process. In other words, as with the first embodiment, a class code representing a class is sent to the memory. The class code is stored in the memory as an address. The value of the center of gravity g(c) of the class is read from the memory. With the value of the center of gravity g(c), predicted value hd' is generated corresponding to equation (18).

$$hd'=DR\times g(c)+\text{base} \quad (18)$$

In the first and second embodiments of the present invention, when blocks with dynamic range DR that is less than a predetermined value are excluded from data to be learnt, the learning process can be prevented from being affected by noise.

In addition, according to these embodiments, predicted coefficients and representative values are pre-learnt. However, in a high speed system, the predicted coefficients and representative values can be obtained on a real time basis. The predicted coefficients and representative values that have been learnt can be updated with those obtained on the real time basis.

Either the method for predicting the values of all pixels of the output image signal with high resolution or the method for predicating the values of pixels that are not present may be selected.

Moreover, the present invention may be applied to image signals other than interlace scanning TV signals and sequence scanning TV signals.

We claim:

1. A signal converting apparatus for converting a first digital image signal into a second digital image signal having higher resolution than the first digital image signal, comprising:

class categorizing means for categorizing a considered pixel of the second digital image signal as a class corresponding to a level distribution pattern in a plurality of reference pixels of the first digital image signal, the plurality of reference pixels of the first digital image signal being disposed spatially and/or chronologically adjacent the considered pixel;

memory means for storing predicted coefficients for each class and for outputting the predicted coefficients in response to class information received from said class categorizing means; and predicted value generating means for calculating linear combination of values of pixels of the first digital image signal spatially and/or chronologically adjacent the considered pixel so as to generate a predicted value of the considered pixel.

2. The signal converting apparatus as set forth in claim 1, further comprising a learning device for determining the predicted coefficients stored in said memory means, wherein said learning device comprises:

thinning means for generating a thinned signal from the second digital image signal;

second class categorizing means for categorizing a considered pixel of the second digital image signal as a class corresponding to a level distribution pattern in a plurality of reference pixels of the thinned digital image signal, the plurality of reference pixels of the thinned digital image signal being disposed spatially and/or chronologically adjacent the considered pixel; and means for determining the predicted coefficients stored in said memory for each class whereby a sum of squares of errors between a true value of the considered pixel and the predicted value is minimized when the predicted value of the considered pixel is generated by a linear combination of a plurality of pixels of the thinned digital image signal and the predicted coefficients.

3. A signal converting apparatus for converting a first digital image signal into a second digital image signal having higher resolution than the first digital image signal, comprising:

class categorizing means for categorizing a considered pixel of the second digital image signal as a class corresponding to a level distribution pattern in a plurality of reference pixels of the first digital image signal, the plurality of reference pixels of the first digital image signal being disposed spatially and/or chronologically adjacent the considered pixel;

memory means for storing representative values for each class and for outputting the representative values in response to class information received from said class categorizing means; and predicted value generating means for generating a predicted value of the considered pixel using the representative values received from said memory means.

4. The signal converting apparatus as set forth in claim 3, wherein a base value of a block composed of a plurality of pixels of the first digital image signal and a value normalized by a dynamic range are used as the representative values.

5. The signal converting apparatus as set forth in claim 3, further comprising a learning device for determining the representative values, wherein said learning device comprises:

thinning means for generating a thinned digital image signal from the second digital image signal;

second class categorizing means for categorizing a considered pixel of the second digital image signal as a class corresponding to a level distribution pattern in a plurality of reference pixels of the thinned digital image signal, the plurality of reference pixels of the thinned digital image signal being disposed spatially and/or chronologically adjacent the considered pixel; and means for determining the representative values of the second digital image signal stored in said memory means for each class by a mean value calculating process.

6. The signal converting apparatus as set forth in claim 1 or 3, wherein said class categorizing means is adapted to categorizing the considered pixel of the second digital image signal as a class corresponding to a pattern of a one-dimensional level distribution of a plurality of reference pixels of the first digital image signal.

7. The signal converting apparatus as set forth in claim 1 or 3, wherein said class categorizing means is adapted to categorizing the considered pixel of the second digital image signal as a class corresponding to a pattern of a two-dimensional level distribution of a plurality of reference pixels of the first digital image signal.

8. The signal converting apparatus as set forth in claim 1 or 3, wherein said class categorizing means is adapted to categorizing the considered pixel of the second digital image signal as a class corresponding to a pattern of a three-dimensional level distribution of a plurality of reference pixels of the first digital image signal.

9. The signal converting apparatus as set forth in claim 1 or 3, wherein said class categorizing means is adapted to compress and encode the values of a plurality of pixels of the first digital image signal and categorize the considered pixel of the second digital image signal as a class corresponding to the encoded values.

10. The signal converting apparatus as set forth in claim 1 or 3, wherein the predicted coefficients or representative values of pixels adjacent to the second digital image signal are used in common so as to save the storage capacity of said memory means.

11. The signal converting apparatus as set forth in claim 1 or 2, wherein the first and second digital image signals are interlace scanning sequence TV signals.

* * * * *

UNITED STATES PATENT AND TRADEMARK OFFICE
CERTIFICATE OF CORRECTION

PATENT NO.   : 5,666,164
DATED        : September 9, 1997
INVENTOR(S)  : Tetsujiro Kondo, et. al.

It is certified that error appears in the above-identified patent and that said Letters Patent is hereby corrected as shown below:

Col.1, line 14, after "Further" insert --,--
Col.6, line 16, change "times access" to --access times--
Col.12, line 7, after "of" second occurrence, insert --the--

Col.14, line 44, change "2" to --3--

Signed and Sealed this

Fifteenth Day of December, 1998

Attest:

BRUCE LEHMAN

*Attesting Officer*     *Commissioner of Patents and Trademarks*